(12) United States Patent
Hedtke

(10) Patent No.: US 7,528,737 B2
(45) Date of Patent: May 5, 2009

(54) TEMPERATURE RESPONSIVE INDICATORS FOR PROCESS CONTROL INSTRUMENTS

(75) Inventor: Robert Hedtke, Young America, MN (US)

(73) Assignee: Rosemount Inc., Eden Prairie, MN (US)

(*) Notice: Subject to any disclaimer, the term of this patent is extended or adjusted under 35 U.S.C. 154(b) by 213 days.

(21) Appl. No.: 11/401,074

(22) Filed: Apr. 10, 2006

(65) Prior Publication Data

US 2007/0241916 A1 Oct. 18, 2007

(51) Int. Cl.
*G01F 1/69* (2006.01)
(52) U.S. Cl. .............. 340/870.01; 340/533; 340/584; 340/679; 340/691.6; 340/870.02; 374/142; 374/143; 73/204.23; 73/204.25; 73/204.27; 116/216; 116/220
(58) Field of Classification Search ........... 340/533, 340/584, 679, 870.02, 870.01; 374/142–143, 374/162; 345/106–107; 73/753, 766, 204.25, 73/204.23, 204.27; 116/101, 216
See application file for complete search history.

(56) References Cited

U.S. PATENT DOCUMENTS

| | | | | |
|---|---|---|---|---|
| 3,617,374 | A | * | 11/1971 | Hodson et al. ............. 349/19 |
| 3,827,301 | A | * | 8/1974 | Parker ..................... 374/162 |
| 4,358,955 | A | | 11/1982 | Rait |
| 4,717,710 | A | | 1/1988 | Shimizu et al. |
| 4,723,656 | A | | 2/1988 | Kiernan et al. |
| 4,804,275 | A | | 2/1989 | Kang et al. |
| 4,919,983 | A | | 4/1990 | Fremin |
| 5,058,999 | A | * | 10/1991 | Davis ..................... 349/197 |
| 5,188,231 | A | | 2/1993 | Kivell et al. |
| 5,400,610 | A | | 3/1995 | Macedo |
| 5,499,597 | A | * | 3/1996 | Kronberg ................. 116/216 |
| 5,607,790 | A | | 3/1997 | Hughen et al. |
| 5,780,746 | A | * | 7/1998 | Brady ..................... 73/766 |
| 5,795,070 | A | | 8/1998 | Geschwender |
| 6,038,927 | A | * | 3/2000 | Karas ..................... 73/706 |
| 6,121,753 | A | | 9/2000 | Walker et al. |
| 6,126,313 | A | * | 10/2000 | Schiller ................... 374/142 |
| 6,158,227 | A | | 12/2000 | Seeley |
| 6,174,319 | B1 | | 1/2001 | Desnos |
| 6,318,020 | B1 | | 11/2001 | Mefferd |
| 6,450,024 | B1 | * | 9/2002 | McCulloch et al. ....... 73/204.25 |
| 6,452,493 | B1 | * | 9/2002 | Ma et al. ................. 340/533 |
| 6,483,275 | B1 | | 11/2002 | Nebrigic et al. |
| 6,522,249 | B1 | * | 2/2003 | Lonigro et al. ........... 340/533 |
| 6,544,925 | B1 | | 4/2003 | Prusik et al. |
| 6,593,588 | B1 | * | 7/2003 | Reimer ................... 250/573 |
| 6,694,912 | B2 | | 2/2004 | Wesley |
| 6,698,590 | B2 | | 3/2004 | Moore |

(Continued)

OTHER PUBLICATIONS

Webpage, Chromatic Technologies, "Sterno Can", http://www.ctiinks.com/page.asp?pageid=0|4|89|126|150&id=0|sterno_can, 1 page, Sep. 22, 2005.

(Continued)

*Primary Examiner*—George A Bugg
*Assistant Examiner*—Anne V Lai
(74) *Attorney, Agent, or Firm*—Kinney & Lange, P.A.

(57) ABSTRACT

A process transmitter includes a temperature responsive indicator to indicate an operating condition of the process transmitter. The operating condition may represent a level of a sensed process variable or an operating temperature of the process transmitter.

15 Claims, 7 Drawing Sheets

U.S. PATENT DOCUMENTS

| | | | |
|---|---|---|---|
| 6,731,221 | B1 | 5/2004 | Dioshongh et al. |
| 6,761,066 | B2 | 7/2004 | Rait |
| 6,880,396 | B2 | 4/2005 | Rait |
| 6,984,993 | B2* | 1/2006 | Ariav .......................... 324/639 |
| 7,035,773 | B2* | 4/2006 | Keyes et al. ................. 702/188 |
| 7,112,766 | B2* | 9/2006 | Lerner ..................... 219/445.1 |
| 7,345,581 | B2* | 3/2008 | Matt ..................... 340/539.26 |
| 2002/0040901 | A1* | 4/2002 | Laken et al. ................. 219/544 |
| 2004/0119681 | A1* | 6/2004 | Albert et al. ................. 345/107 |
| 2005/0035867 | A1* | 2/2005 | Matt .......................... 340/601 |
| 2006/0267167 | A1* | 11/2006 | McCain ...................... 257/678 |
| 2007/0268153 | A1* | 11/2007 | Gansen .................. 340/870.01 |

OTHER PUBLICATIONS

Webpage, ScreenWeb, "Color-Changing Inks", http://www.screenweb.com/index.php/channel/6/id/1425/, 6 pages, Sep. 30, 2005.

Webpage, Howstuffworks, "How Do The Battery Testers on Battery Packages Work?", http://science.howstuffworks.com/question423.html, 3 pages, Sep. 30, 2005.

Selection Guide, Acheson Colloids Company, "PTF for Display Applications Touch Screen and Display Materials", 1 page.

Product Data Sheet, Acheson Colloids Company, "Advanced Performing PTF Material for Membrane Keyboards and Flexible Printed Circuits", 3 pages.

Webpage, "Chapter 6: Refrigerated Fish and Fishery Products", http://seafood.ucdavis.edu/haccp/compendium/Chapt06.html, 9 pages, Sep. 29, 2005.

Webpage, 3M, 3M—Personal Care, "Time/Temperature Monitoring: 3M™ MonitorMark™ Time Temperature Indicators", http://www.3m.com/us/healthcare/personal_care/time_temp/monitormark.jhtml, 2 pages, Aug. 2, 2005.

Webpage, Vitsab, "The Difference Between Threshold and Time Temperature Integration", http://wwwvitsab.com/VNcompare.html, 2 pages, Aug. 2, 2005.

Webpage, Vitsab, "Vitsab CheckPoint® Temperature Labels", http://www.vitsab.com/VNhome_lower.html, 2 pages, Aug. 2, 2005.

Webpage, Cold Ice, Inc., "The Industry Standard for Gel Ice and Insulated Shipping Containers WarmMark™ Time Temperature Indicators", http://www.coldice.com/warmmark_temperature_indicators.html, 2 pages, Aug. 2, 2005.

Webpage,, The TTI Group @ Bayreuth, Haarer, et al., "TTI—a Novel Time-Temperature Indicator", http://btp8x8.phy.uni-bayreuth.de/haarer/research/tti.html, 8 pages, Aug. 2, 2005.

* cited by examiner

TEMPERATURE RESPONSIVE INDICATORS FOR PROCESS CONTROL INSTRUMENTS

BACKGROUND OF THE INVENTION

This invention relates generally to indicators used in industrial process control systems. More particularly, the present invention relates to process transmitters having temperature responsive indicators.

Process transmitters are used to remotely or locally monitor process variables, such as pressure, temperature, flow and level, of process fluids used in industrial processes. Process transmitters include sensors or transducers that produce an electrical output in response to physical changes in the process variable. For example, capacitive pressure transducers or piezoresistive pressure transducers produce an electrical signal as a function of the pressure of a process fluid. The electrical signal of the sensor is processed by the transmitter circuitry to produce an electrical output that can be monitored as an indication of pressure of the process fluid. Process transmitters also include electronics for either remotely or locally monitoring the electrical output. Remotely monitored transmitters include electronics that transmit the electrical output over a control loop or network to a central monitoring location such as a control room. Locally monitored transmitters include displays, such as digital LCD screens or analog dials, that exhibit the electrical output at the site of the process transmitter in a readable format. In other embodiments, process transmitters include components for both local and remote monitoring.

Digital and analog displays can provide a highly precise indication of the measured process variable such that very small changes in the measured process variable are easily detected. However, such precise measurements are not always required. For certain applications, digital and analog displays provide unneeded accuracy and are therefore more expensive than necessary for such applications. Sometimes, only a quick visual indication of the approximate magnitude of the process variable reading is necessary. For instance, maintenance personnel conducting routine checks of production facilities may only need to know if process transmitters are operating and the sensed process variable is at a safe level. This is particularly so when the precise process variable reading is simultaneously being transmitted to and monitored in the control room. Thus, there is a need for an accurate, low-cost indicator for process transmitter displays.

Power consumption is another drawback associated with digital and analog displays. Process transmitters typically draw their power through the control loop or network, or through wiring systems typically found in industrial settings. In order to ensure compatibility with particular control loops or networks, process transmitters are often required to draw less than 4 mA of current. As advances in micro-technology and data transmission progress, it continues to be a challenge to design electronics that are able to operate below a current draw of 4 mA and provide advanced data transmission. Having the additional burden of powering a display unit provides an additional design challenge. Thus, there is a need for process transmitter indicators that have low power consumption.

Also, process transmitters are designed to function within defined temperature ranges. Typically the ambient operating temperature limit of transmitters is −40° F. (−40° C.) to 185° F. (85° C.) and the storage temperature limit is −50° F. (−51° C.) to 230° F. (110° C.). Thus there is a need for a process transmitter having a low cost visual indication when these temperatures are exceeded.

BRIEF SUMMARY OF THE INVENTION

A process transmitter includes a temperature responsive indicator that is visible from an exterior of the transmitter and is visually responsive to a temperature change.

In a first embodiment of the invention, a process transmitter for measuring a process variable comprises a sensing element, transmitter circuitry and a temperature responsive indicator. The sensing element has an sensor output responsive to a process variable. The transmitter circuitry produces an electrical output as a function of the sensor signal. The temperature responsive indicator responds to heat produced as a function of the electrical output in order to produce a visual indication representative of the process variable.

In a second embodiment of the invention, a process transmitter for measuring a process variable comprises a sensing element, transmitter circuitry, a housing and a temperature responsive indicator. The temperature responsive indicator is positioned on the housing and is responsive to a temperature of the process transmitter housing.

DETAILED DESCRIPTION

Figure 1:
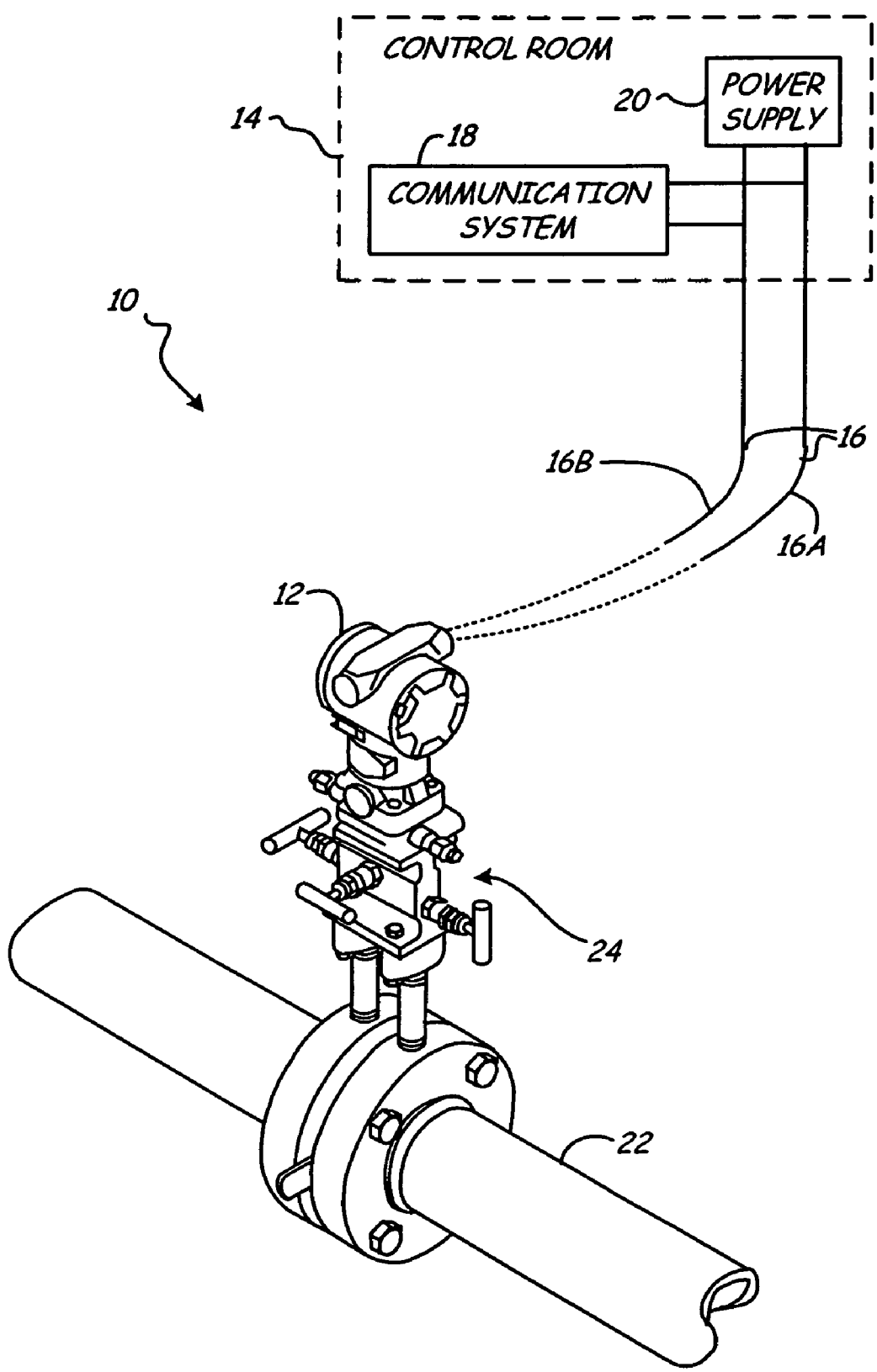
FIG. 1 shows an example of a process control system in which a process transmitter of the present invention is used.

FIG. 1 shows process control system 10 in which process transmitter 12 of the present invention is used. Process control system 10 includes process transmitter 12, control room 14 and control loop 16. Control room 14 includes communication system 18 and power supply 20. Process transmitter 12 is coupled with piping 22, in which a process fluid flows, through manifold 24. Process transmitter 12 includes a sensor and electronics for monitoring a process variable such as temperature, pressure, flow or level of the process fluid. Process transmitter 12 generates an electrical signal based on the sensed process variable.

In one embodiment, process transmitter 12 is a two-wire transmitter for operating on a 4-20 mA loop. In such an embodiment, control loop 16 includes first wire 16A and second wire 16B for supplying power to process transmitter 12 from power supply 20. Control loop 16 also permits process transmitter 12 to communicate with communication system 18. Typically, a 4 mA DC current provides sufficient energy for operating the sensor and transmitter circuitry of process transmitter 12 and a display for showing an output representing the sensed process variable. Process transmitter 12 transmits an output to communication system 18 over control loop 16 utilizing a 4 mA to 20 mA output signal generated by the transmitter circuitry of process transmitter 12. The 4-20 mA output signal is a function of the magnitude of the sensed process variable. In other embodiments, process transmitter 12 communicates with control room 14 over a wireless network.

Figure 2A:
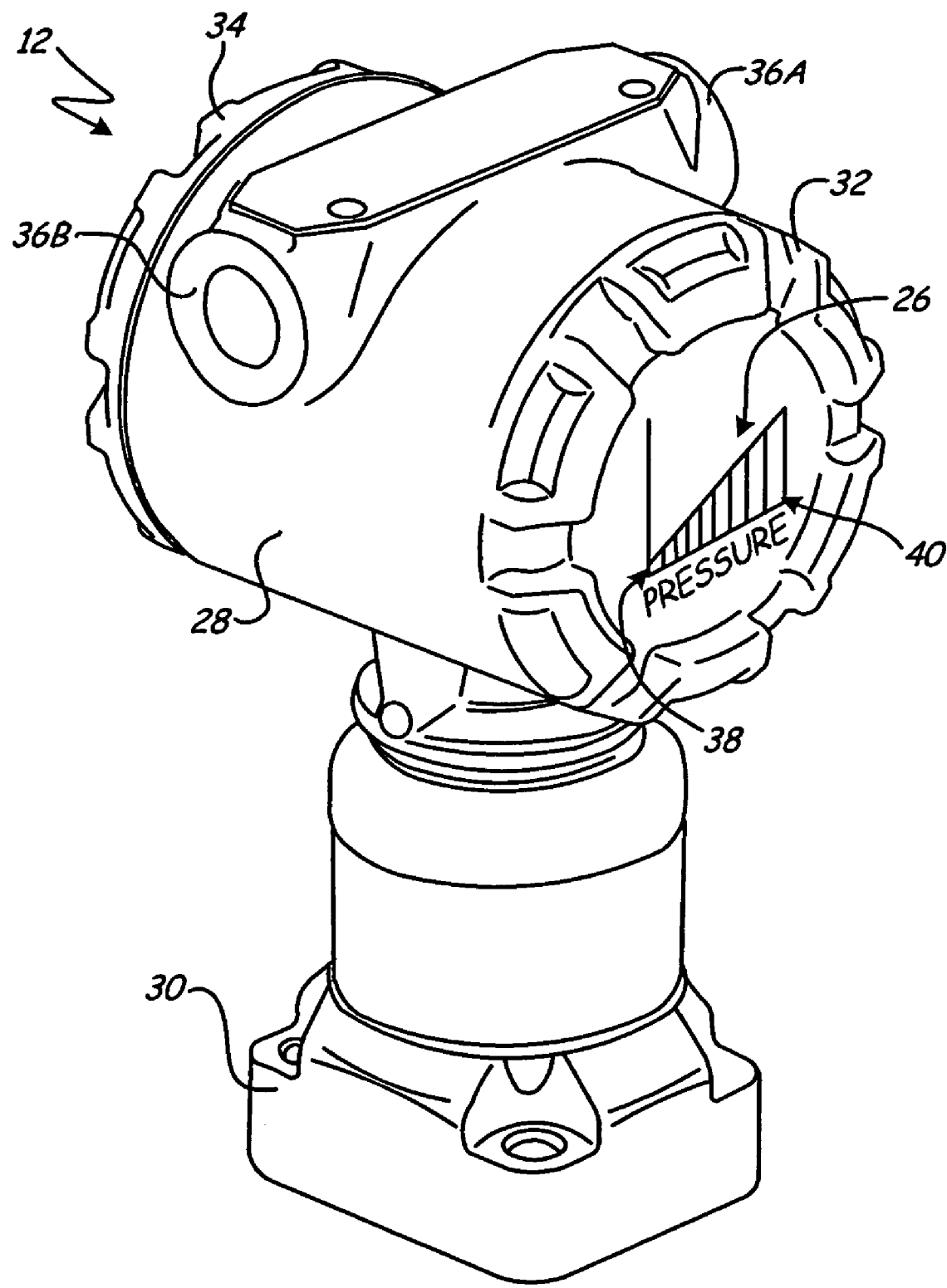
FIG. 2A shows a process transmitter of the present invention having a temperature responsive indicator used as a local display.

FIG. 2A shows process transmitter 12 of the present invention having temperature responsive indicator 26 used as the local display. Process transmitter 12 comprises indicator 26, housing 28 and pressure flange 30. Housing 28, front cover 32 and rear cover 34 provide a structure for protecting the electronics and providing a field wiring terminal block to process transmitter 12. Front cover 32 has a glass window to allow viewing of indicator 26. Rear cover 34 is removable to allow access to a terminal block for connecting wires 16A and 16B of control loop 16 to the electronics of process transmitter 12. Housing 28 also includes conduit connections 36A and 36B that are used for feeding connecting wires 16A and 16B into housing 28. Pressure flange 30 is used to connect process transmitter 12 with manifold 24 and piping 22. The electronics of process transmitter 12 produce a 4-20 mA output signal as a function of a process variable, that is transmitted across control loop 16. The 4-20 mA signal is also used in conjunction with indicator 26 to provide a local, visual indication of the process variable magnitude. As indicator 26 is typically configured, first end 38 indicates low pressure and a low output signal level, while second end 40 indicates high pressure and a high output signal level.

Figure 2B:
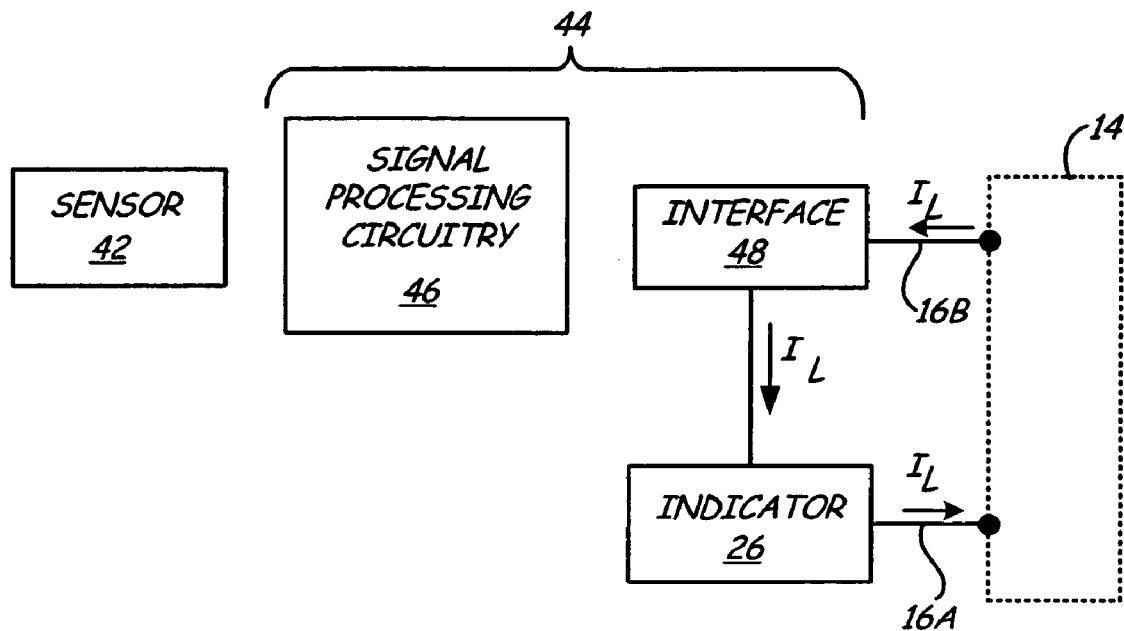
FIG. 2B is a block diagram of the circuitry of the process transmitter of FIG. 2A.

FIG. 2B is a block diagram of one embodiment of process transmitter 12, which includes temperature responsive indicator 26, sensor 42 and transmitter circuitry 44 including signal processing circuitry 46 and interface 48. Sensor 42 produces a sensor signal proportional to the sensed pressure. Signal processing circuitry 46 receives the sensor signal and performs such conditioning functions as filtering the sensor signal and adjusting the sensor signal for temperature variations. Circuitry 46 produces a control signal that causes interface 48 to adjust loop current $I_L$ to a value between 4 mA and 20 mA that is representative of the sensed process variable. The loop current $I_L$ flows from control room 14 through wire 16A, through interface 48 and indicator 26 to wire 16B, and back to control room 14.

Figure 2C:
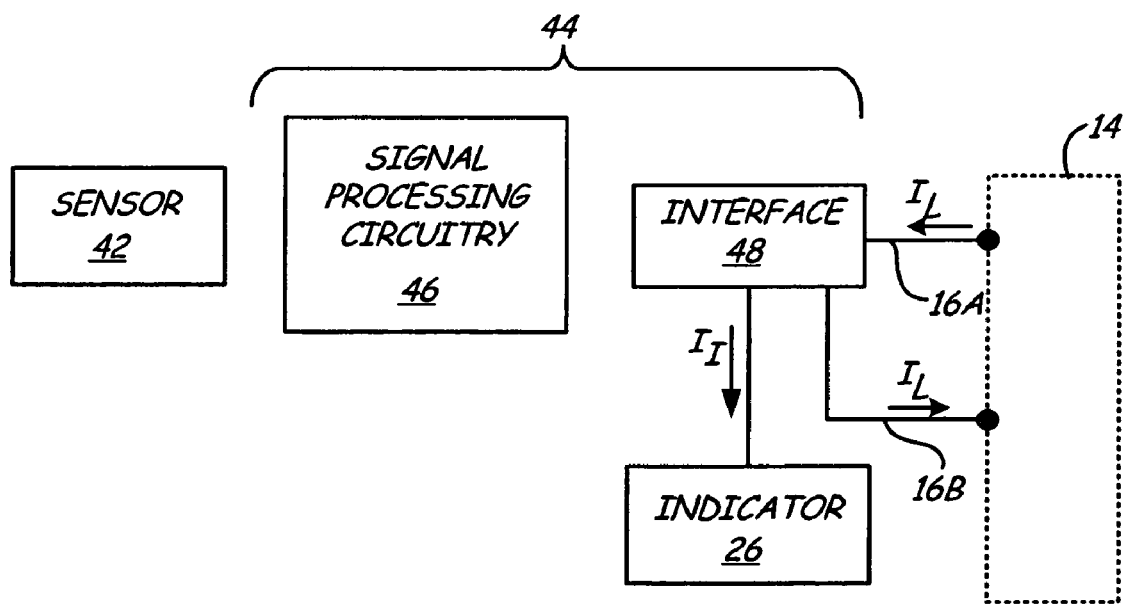
FIG. 2C shows a block diagram of another embodiment of the circuitry of the process transmitter of FIG. 2A.

FIG. 2C is a block diagram of another embodiment of process transmitter 12, which includes temperature responsive indicator 26, sensor 42 and transmitter circuitry 44 including signal processing circuitry 46 and interface 48. Sensor 42 produces a sensor signal proportional to the sensed pressure. Signal processing circuitry 46 receives the sensor signal and performs such conditioning functions as filtering the sensor signal and adjusting the sensor signal for temperature variations. Circuitry 46 produces a control signal that causes interface 48 to adjust loop current $I_L$ to a value between 4 mA and 20 mA that is representative of the sensed process variable. The loop current $I_L$ flows from control room 14 through wire 16A, through interface 48 and back to control room 14. A separate current $I_I$ signal is fed directly to indicator 26. This embodiment allows the indicator to be used with digital protocol devices such as Fieldbus.

Figure 2D:
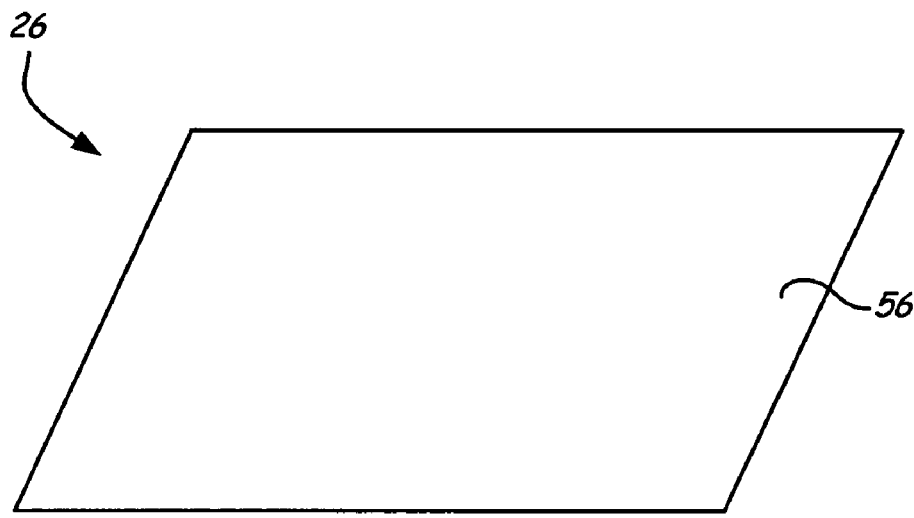
FIG. 2D shows an exploded view of the temperature responsive indicator of FIG. 2A.
Figure 2D:
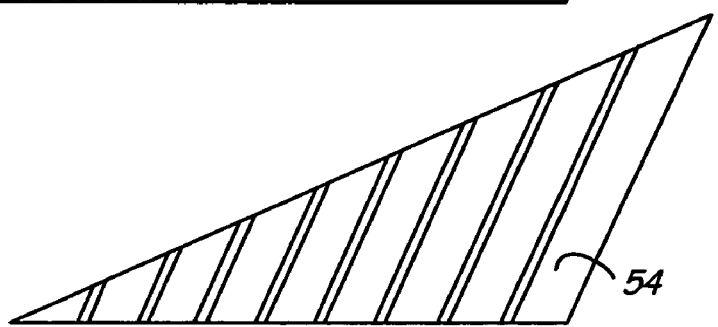
Figure 2D:
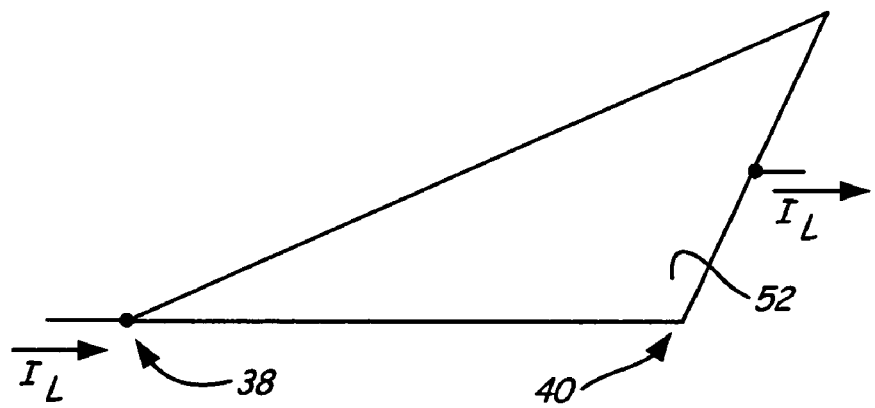
Figure 2D:
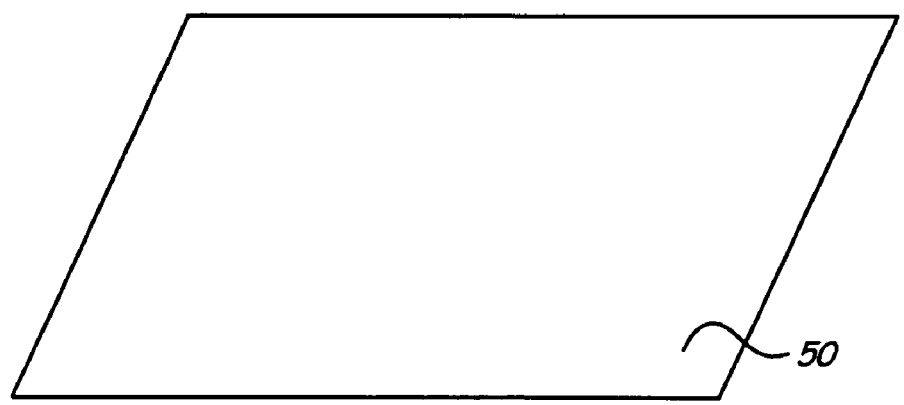

FIG. 2D shows an exploded view of temperature responsive indicator 26 of FIG. 2A. Indicator 26 includes a conductive ink layer that is resistance heated by the 4-20 mA output signal, current $I_L$ (or current $I_I$, as the case may be). The conductive ink layer thereby causes a thermochromic ink layer to change color in response to the amount of heat created in the conductive ink layer. Thus, indicator 26 provides a low-cost temperature responsive indicator that provides a visual representation of the magnitude of the sensed pressure. Indicator 26 is constructed in accordance with known principles for fabricating temperature responsive voltage indicators, some of which are disclosed in U.S. Pat. Nos. 4,006,414; 4,702,564; 4,723,656; 5,188,231 and 5,607,790.

In one embodiment, indicator 26 comprises first protective layer 50, conductive ink layer 52, thermochromic ink layer 54 and second protective layer 56. First protective layer 50 provides a substrate on which to print thermochromic ink layer 52 and conductive ink layer 54, while also protecting the ink layers. First protective layer 50 of indicator 26 may be made of any material suitable for printing on, such as paper or plastic materials.

Conductive ink layer 52 allows current $I_L$ to be passed across indicator 26. Conductive ink layer 52 is printed onto, or otherwise adhered to, first protective layer 50 in the shape of a right-angle triangle, such that the surface area at first end 38 is smaller than the surface area at second end 40. Conductive ink layer 52 can be printed onto first protective layer 50 in any pattern in which the surface area of the conductive ink increases as it moves from one end to the other. In one embodiment, the conductive ink is Electrodag® 725A such as is commercially available from Acheson Colloids Company, Port Huron, Mich., USA.

Thermochromic ink layer 54 is printable on, or otherwise positioned adjacent to, conductive ink layer 52 and is shaped to match that of the conductive ink layer. Thermochromic ink layer 54 can have any shape that allows visual differentiation of the process variable level, such as a single bar shape or a triangular shape. Thermochromic ink layer 54 also includes discrete bars to further indicate specific levels of the process variable. Bars at first end 38 of indicator 26 indicate low pressure. Bars at second end 40 of indicator 26 indicate high pressure. As current $I_L$ (or $I_I$) passes across indicator 26, the resistance of conductive layer 52 creates heat, thereby heating up thermochromic ink layer 54. As current $I_L$ (or $I_I$) flows through conductive ink layer 52 the current density decreases from first end 38 to second end 40. For any given magnitude of $I_L$ (or $I_I$), the current density across conductive ink layer 52 decreases toward second end 40. As a result, the amount of heat produced per unit area of conductive ink layer 52 decreases from first end 38 to second end 40. The temperature at each point of conductive ink layer 52 depends directly on the current density at that point.

Thermochromic ink layer 54 alters its color at a threshold temperature. The threshold temperature is induced in thermochromic ink layer 54 by resistance heating of conductive ink layer 52 by current $I_L$ (or $I_I$). Because the thermochromic ink is affected by ambient temperature the indicator will not function optimally under all ambient temperature conditions. However, the use of this indicator is ideally suited for factory applications where the ambient temperature is controlled, and ambient influences are known. The threshold temperature is reached at some point along the temperature gradient in conductive ink layer 52 for each level of current, and moves from first end 38 to second end 40 as the current density of current increases. At the lowest level of current (e.g. 4 mA), the threshold temperature is reached in conductive ink layer 52 toward first end 38. As current increases, the threshold temperature is reached in portions of conductive ink layer 52 occupying larger surface areas, toward second end 40. The highest level of current (e.g. 20 mA), produces enough current density, and thus enough heat, to reach the threshold temperature at second end 40 of conductive ink layer 52.

The threshold temperature can be varied according to design needs and depends on the thickness of the conductive ink and thermochromic ink layers and other factors. At a low temperature, thermochromic ink layer 54 is a first color, such as black. The thermochromic ink is formulated to change from the first color to a second color, such as green, at the threshold temperature. In other embodiments, thermochromic ink layer 54 turns transparent at the threshold temperature. The thermochromic ink can be any temperature responsive ink, such as the class of ink disclosed in U.S. Pat. No. 4,717,710, or thermochromic inks such as ones distributed by Dow Corning Corporation, Midland, Mich., USA or Chromatic Technologies, Inc., Colorado Springs, Colo., USA.

Second protective layer 56 covers and shields the ink layers while also allowing thermochromic ink layer 54 to be viewed. In one embodiment, second protective layer 56 is a transparent plastic material.

In another embodiment of process transmitter 12, indicator 26 utilizes a liquid crystal based material rather than a thermochromic ink. Liquid crystal materials, particularly cholesteric crystal materials, are clear at room temperature and change to a color at a threshold temperature. Liquid crystal based materials are sensitive to very small changes in temperature and are suited for use where gradual temperature changes will occur, but are somewhat more expensive. Therefore, they are particularly suitable for use as an indicator where somewhat more precision is necessary and somewhat higher costs are acceptable.

Figure 3A:
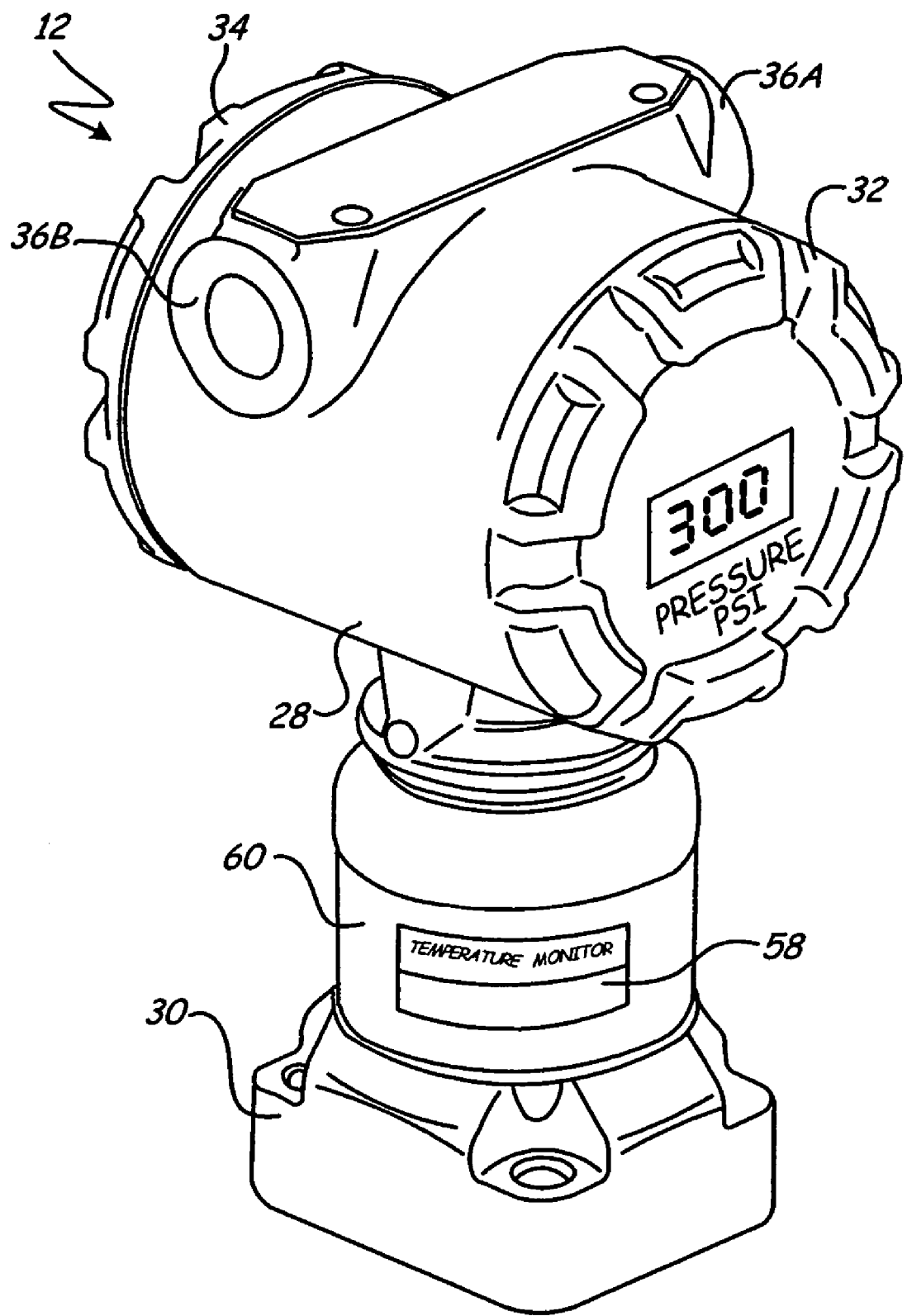
FIG. 3A shows an unactivated warning label having a second embodiment of the temperature responsive indicator of the present invention.
Figure 3B:
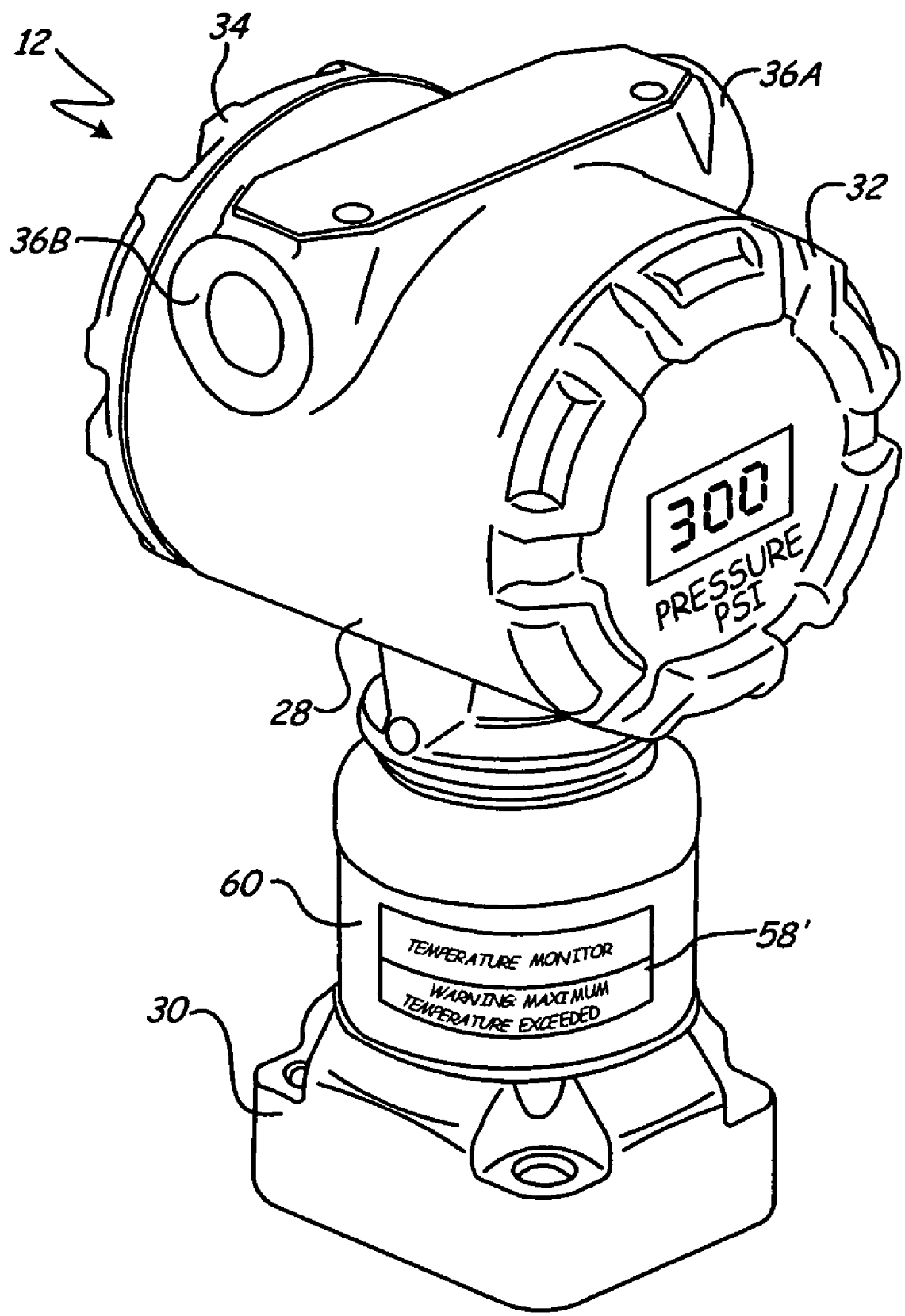
FIG. 3B shows the warning label of FIG. 3A in an activated state.

FIGS. 3A and 3B show warning label 58 having a second embodiment of the temperature responsive indicator of the present invention. FIG. 3A shows thermochromic warning label 58 in an unactivated state, typically indicating operating conditions at temperatures within the normal operating range. FIG. 3B shows activated thermochromic warning label 58', typically indicating operating conditions at temperatures outside the normal operating range. Process transmitter 12 includes warning label 58 and module housing 60. Housing 60 provides protection for electronics and sensors of process transmitter 12. Thermochromic warning label 58 includes a thermochromic ink layer that alters its appearance in response to a temperature change in order to reveal a message indicating a changed operating state of process transmitter 12. Thermochromic warning label 58 is affixed to the outside of module housing 60 in a conspicuous location such that it is easily noticeable by maintenance personnel or other persons. Warning label 58 is in close contact with module housing 60 such that the thermochromic ink layer responds to temperature variations in housing 60. However, warning label 58 is responsive to both the ambient air temperature and the temperature of the process fluid inside pipe 22 (shown in FIG. 1). The combination of ambient and process temperature causes warning label 58 to exceed the maximum specified operating value of the process fluid when the process is operating outside of the normal operating range, thus activating warning label 58.

Figure 3C:
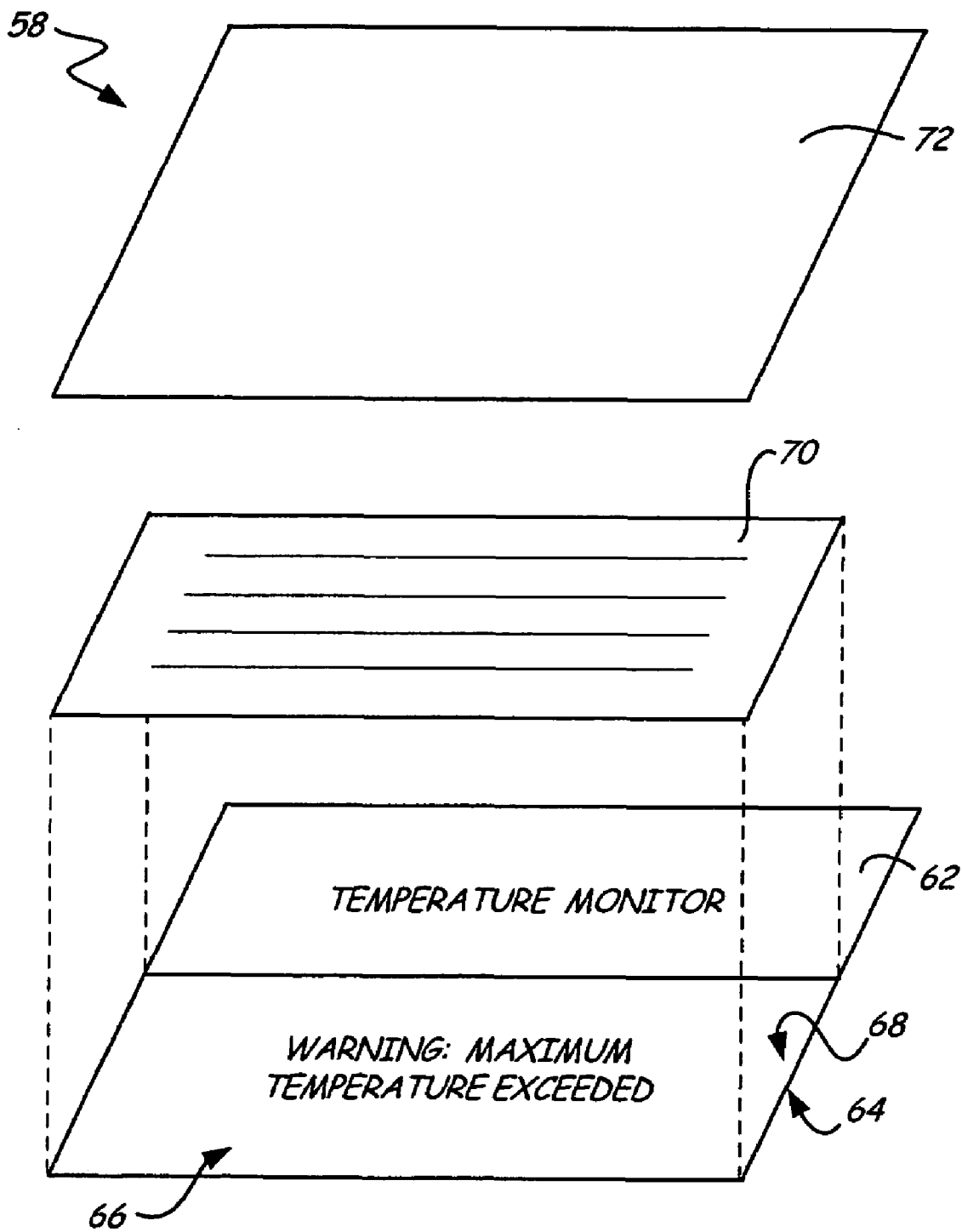
FIG. 3C shows an exploded view of the warning label of FIGS. 3A and 3B.

FIG. 3C shows an exploded view of the warning label of FIGS. 3A and 3B. Label 58 is constructed in accordance with known principles for fabricating thermochromic warning labels, some of which are disclosed in U.S. Pat. Nos. 4,161,557; 4,717,710; 6,649,912 and 6,761,066. In one embodiment, warning label 58 comprises substrate 62 having an adhesive on bottom side 64 and a visual message 66 on top side 68. Substrate 62 and the adhesive should be selected and applied to minimize insulating thermochromic ink layer 70 from housing 60. Thermochromic ink layer 70 is printed over visual message 66 and changes from an opaque state to a transparent state when its temperature, dictated by the temperature of module housing 60, reaches a threshold level. Thermochromic ink layer 70 can be any temperature responsive ink or fluid. In one embodiment, thermochromic ink layer 70 is of the class of ink disclosed in U.S. Pat. No. 4,717,710. In other embodiments, thermochromic inks such as ones distributed by Dow Corning Corporation, Midland, Mich., USA or Chromatic Technologies, Inc., Colorado Springs, Colo., USA may be used. In another embodiment of warning label 58, the thermochromic fluid is a leucodye, which typically is configured to change from an opaque color, such as blue, to a clear state. Leucodye is particularly suited for warning label applications because it is inexpensive. In another embodiment, warning label 58 utilizes a liquid crystal temperature responsive layer in place of thermochromic ink layer 70. Protective layer 72 is placed over substrate 62 and thermochrornic ink layer 70 to protect the printed message and the ink from damage. In one embodiment, protective layer 72 is a clear plastic laminate.

Process transmitter 12 typically has two key temperature limitations. First, the electronics of process transmitter 12 will only properly operate up to a certain temperature threshold. Second, the sensor and electronics can only physically withstand a maximum temperature threshold before they become permanently damaged. Therefore, warning label 58 can be provided to indicate when process transmitter 12 has exceeded one or both of these temperature limitations. The exact level of each temperature threshold depends on the type of sensor and electronics used. In other embodiments, warning label 58 can be used to indicate a process running at any other temperature. The threshold temperature of warning label 58 can be specifically designed for each application, with temperature limits typically in the range of 200° F. (93° C.)-300° F. (149° C.).

Before the threshold temperature is reached, unactivated warning label 58 of FIG. 3A displays a permanent message indicating, for example, that the label is a temperature monitor. In one embodiment, warning label 58 reads: "Temperature Monitor." Thermochromic ink layer 70 remains in an opaque state to conceal the thermochromic ink message. The presence of an unactivated warning label 58 indicates that process transmitter 12 is operating within safe temperature ranges. In one embodiment, the unactivated thermochromic ink of warning label 58 is green to conspicuously indicate normal operating conditions. If the combination of ambient air temperature and the module housing temperature exceeds the threshold temperature at module housing 60, the thermochromic ink of warning label 58 activates and turns transparent in appearance to reveal the concealed visual message. Activated warning label 58' of FIG. 3B displays a message indicating that process transmitter 12 is operating at a temperature that exceeds a threshold temperature. In one embodiment, activated warning label 58' reads: "Warning: Maximum Temperature Exceeded." In one embodiment, the message is printed on a red background to conspicuously indicate unsafe operating conditions. Thus, maintenance personnel can easily get a visual indication when the module exceeds its maximum operating temperature. This is particularly useful when process transmitter 12 does not include a local display or is not connected to a control room.

In other embodiments, warning label 58 includes a temperature limit indicator to indicate when the temperature of process transmitter 12 has exceeded a threshold temperature. In such cases, warning label 58 includes a chemical that has a desired melt point. Once the threshold temperature is reached, the chemical melts and leaves a visible indication that the process transmitter has been exposed to the threshold temperature. For example, a small circle may be white indicating that the process transmitter has not been exposed to the melt temperature. Once the melt temperature is reached the circle turns blue by the melted chemical. In one embodiment, warning label 58 may include a message such as: "Warning: This product has exceeded its maximum operating temperature if this circle is blue!" Suitable labels, such as the MonitorMark® line of products commercially available from 3M Corporation, St. Paul, Minn., USA and the Vitsab® line of products commercially available from Cox Technologies, Inc., Belmont, N.C., USA, are known in the art.

Although the present invention has been described with reference to preferred embodiments, workers skilled in the art will recognize that changes may be made in form and detail without departing from the spirit and scope of the invention.

The invention claimed is:

1. A process transmitter comprising:
   a housing;
   a sensor within the housing for producing a sensor signal as a function of a process variable;
   transmitter circuitry within the housing for producing a variable electrical output based on the sensor signal and communicating the variable electrical output over a process control loop; and
   a temperature responsive indicator visible from an exterior of the housing, the indicator being visually responsive to a temperature change of the indicator induced by resistance heating of a conductive ink generated by the variable electrical output of the transmitter circuitry before being communicated over the control loop.

2. The process transmitter of claim 1 wherein the temperature responsive indicator includes a layer of thermochromic ink that displays a visual representation of a magnitude of the process variable.

3. The process transmitter of claim 1 wherein the temperature responsive indicator is located within the housing and is visible through an opening or a window in the housing.

4. The process transmitter of claim 1 wherein the visual responsiveness of the temperature responsive indicator indicates a magnitude of the process variable.

5. The process transmitter of claim 1 wherein the temperature responsive indicator includes a layer of liquid crystal material adjacent the layer of conductive ink, wherein the resistance heating of the conductive ink layer causes a visual change in the appearance of the liquid crystal material layer.

6. The process transmitter of claim 1 wherein the transmitter circuitry and temperature responsive indicator are connected in series such that the variable electrical output is passed through the temperature responsive indicator before communication with the control loop.

7. An industrial process transmitter comprising:
   a housing for connecting to an industrial process;
   a sensor positioned within the housing and configured to interface with the industrial process to measure an industrial process parameter selected from the group consisting of pressure, temperature, level and flow of an industrial process fluid, and generate a variable sensor signal that is a function of the measured process parameter;
   transmitter electronics positioned within the housing and connected to the sensor to condition and communicate the variable sensor signal over an external control loop as a loop current; and
   a temperature responsive indicator visible from an exterior of the housing, the indicator comprising:
      an electrically conductive layer configured to receive the loop current en route to the external control loop such that the electrically conductive layer undergoes a temperature change due to resistive heating; and
      a temperature responsive layer positioned adjacent the electrically conductive layer for visually indicating a magnitude of the measured process parameter.

8. The industrial process transmitter of claim 7 wherein:
   the electrically conductive layer comprises conductive ink; and
   the temperature responsive layer comprises liquid crystal material.

9. The industrial process transmitter of claim 7 wherein:
   the electrically conductive layer comprises conductive ink; and
   the temperature responsive layer comprises thermochromic ink.

10. The industrial process transmitter of claim 7 wherein a surface area of the electrically conductive layer increases in a direction of current flow of the loop current such that the resistive heating of the electrically conductive layer decreases in the direction of current flow.

11. The industrial process transmitter of claim 7 wherein a current density of the loop current decreases in the direction of current flow across the electrically conductive layer such that the resistive heating of the electrically conductive layer decreases in the direction of current flow.

12. The industrial process transmitter of claim 11 wherein the temperature responsive layer is configured to visually change appearance when the electrically conductive layer exceeds a threshold current density.

13. The industrial process transmitter of claim 12 wherein the current density changes proportionally to a magnitude of the variable sensor signal.

14. The industrial process transmitter of claim 13 wherein the temperature responsive layer indicates the magnitude of the variable sensor signal at the threshold current density.

15. The industrial process transmitter of claim 7 wherein the electrically conductive layer is connected in series with the transmitter electronics and the control loop.

* * * * *